P. H. WATKINS.
GUM SHEETING AND SCORING MACHINE.
APPLICATION FILED MAY 28, 1920.

1,357,665.

Patented Nov. 2, 1920.
2 SHEETS—SHEET 1.

Inventor
Parke H. Watkins.

P. H. WATKINS.
GUM SHEETING AND SCORING MACHINE.
APPLICATION FILED MAY 28, 1920.

1,357,665.

Patented Nov. 2, 1920.
2 SHEETS—SHEET 2.

Inventor
Parke H Watkins.
By Offield, Towle & Linthicum
Attys:

UNITED STATES PATENT OFFICE.

PARKE H. WATKINS, OF CHICAGO, ILLINOIS, ASSIGNOR TO WILLIAM WRIGLEY, JR. COMPANY, OF CHICAGO, ILLINOIS, A CORPORATION OF WEST VIRGINIA.

GUM SHEETING AND SCORING MACHINE.

1,357,665.  Specification of Letters Patent.  Patented Nov. 2, 1920.

Application filed May 28, 1920. Serial No. 384,866.

*To all whom it may concern:*

Be it known that I, PARKE H. WATKINS, a citizen of the United States, and a resident of Chicago, in the county of Cook and State of Illinois, have invented certain new and useful Improvements in Gum Sheeting and Scoring Machines, of which the following is a specification.

This invention relates to improvements in machines especially designed for use in the manufacture of chewing gum, and ordinarily termed a sheeting machine, having as its function the reduction of the large masses of gum in plastic form to relatively thin sheets, and the scoring of the sheets into the smaller units or individual sticks.

The object of this invention is to provide an alarm device to be used in conjunction with a sheeting machine, its purpose being to inform the operator of the machine when the continuous sheet has not the desired width at any point, as determined by the width of the scoring rolls, and thereby enable the operator to prevent further advancement of the sheet, and to rectify the undesired conditions existing. A clearer understanding of the object of the invention will be had from the following description of the machine, its operation, and the alarm device itself, and from the accompanying drawings in which—

Figure 1:
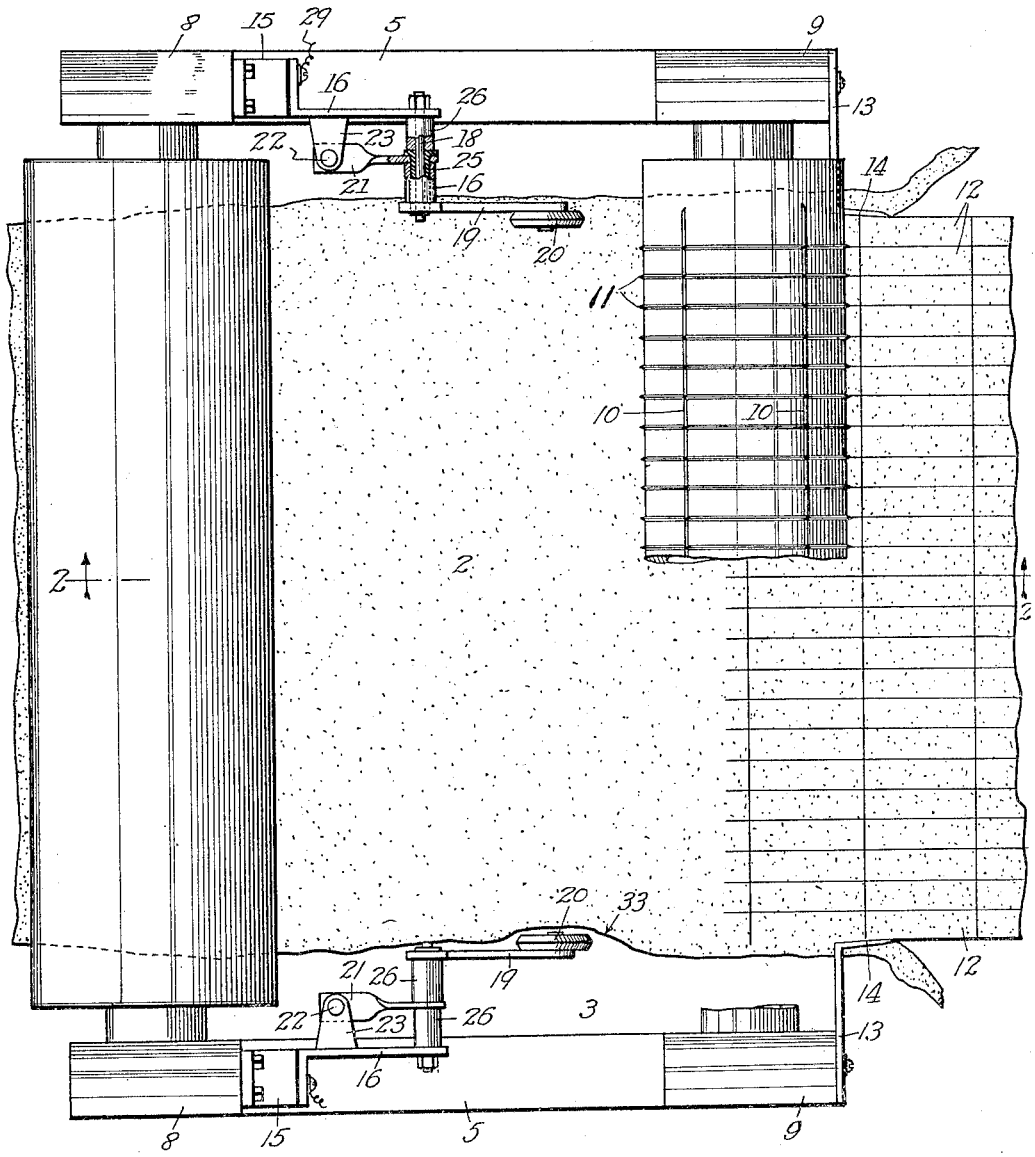
Figure 2:
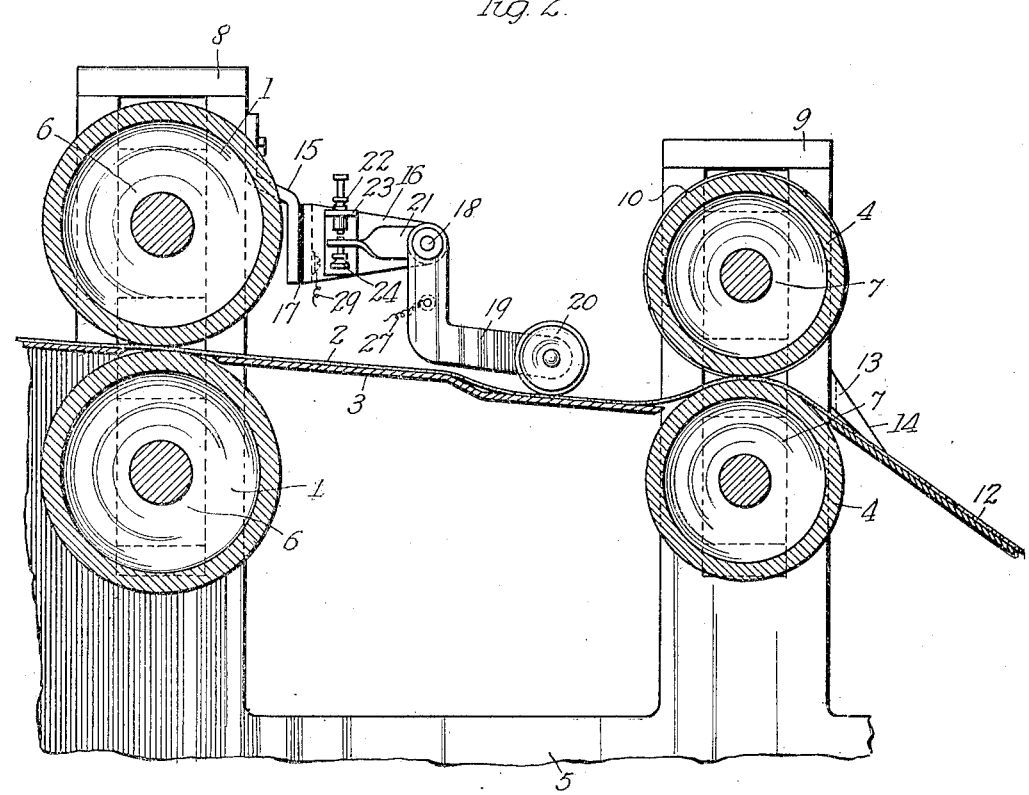
Figure 3:
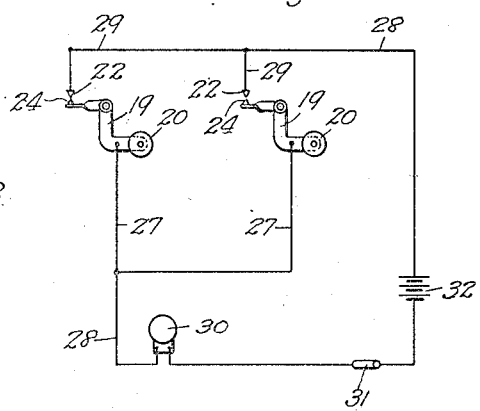

Figure 1 is a top plan view of a portion of the so-called sheeting machine, showing the manner in which the gum is advanced therethrough in the form of a continuous sheet, the means for scoring the sheet, and the parts constituting the alarm device, Fig. 2 is a view of the same part shown in Fig. 1 in vertical section, as taken on line 2—2 of Fig. 1, and Fig. 3 is a diagrammatic representation of the alarm circuit.

As hereinbefore suggested, a sheeting machine is used in the manufacture of gum for the purpose of reducing the masses or "batches" as they are called, of the plastic gum, into the form of a continuous sheet of the desired thickness, and furthermore, for scoring the sheet to form the relatively small pieces or sticks. A sheeting machine comprises in general a series of rolls between which the material is passed until it is finally reduced to a desired thickness. As illustrated in the drawings, the gum is advanced in a horizontal direction between two vertically arranged rolls 1—1 which may be said to represent the final pair of reduction rolls. The gum in the form of a relatively wide sheet 2 of the desired thickness is passed along a substantially horizontal plate 3 guiding the sheet between another pair of vertically arranged rolls 4—4 which may be termed the scoring rolls.

The pairs of rolls 1—1 and 4—4 are supported at their ends by the side frame members 5—5 of the machine, each pair being journaled in vertically adjustable journal blocks 6—6 and 7—7 respectively, said blocks being mounted in vertical standards 8 and 9 respectively, formed integral with the side frame members 5—5 of the machine.

The plate 3 as before suggested, extends between the pairs of rolls 1—1 and 4—4, although preferably inclined to a slight degree downwardly from the former to the latter. The scoring rolls 4—4 preferably comprise a smooth surfaced roll below, and a scoring roll above, the latter being provided with a series of longitudinal scoring blades 10 spaced equidistantly about the periphery of the roll, and a plurality of circumferential scoring blades 11 spaced equidistantly throughout the length of said roll. The sheet 2 as it is advanced between the scoring rolls 4—4 is scored or partially cut into the form of small rectangular pieces 12, these pieces being ultimately broken up into sticks and wrapped in the familiar package form. Fixed to the side frame members 5—5 and immediately beyond the scoring rolls 4—4 are what may be termed trimming knives 13—13, these knives extending inwardly and terminating in longitudinally extending plates 14—14 adapted to engage the margins of the sheet, and to trim the edges thereof along an imaginary line which determines the lateral extremities of the scored area.

Referring now to the device embodying the features of the invention, the same comprises parts arranged as follows:

A supporting bracket 15 is mounted on each of the vertical standards 8 supporting the rolls 1—1, each bracket including a horizontally extending arm 16 positioned a short distance above the plate 3. The arm 16 is insulated from the remaining portion of the bracket by means of an interposed plate of insulating material 17. At the end of each arm 16 is mounted a transverse and inwardly extending bolt 18 having an L shaped arm 19 pivotally mounted at its inner end, said arm being free to move in a vertical plane. At the end of each arm 19 is a roller 20 adapted to ride freely in contact with the upper surface of the sheet 2. Each arm 19 and its roller 20 is so mounted with relation to the scoring roll 7 and the trimming knives 13—13 that the line of contact of the rollers 20—20 coincide with the trimmed marginal edges of the scored sheet.

Referring further to the parts associated with each roller 20 and arm 19, there is mounted on the bolt 18 a horizontally extending contact arm 21, said arm extending parallel to the arm 16 of the bracket, and terminating below a contact point 22 mounted in a transverse arm 23 secured to the bracket arm 16. Extending through the end of the contact arm 21 is a contact screw 24. The contact arm 21 is insulated from the bolt 18 by means of an insulating sleeve 25 which also acts to insulate the L shaped arm 19 from said bolt 18. Spacing sleeves 26—26 are mounted on the bolt on either side of the contact arm 21. It is to be understood that the device above described is the same on both sides of the machine, so that there is a roller 20 which contacts with the sheet along longitudinal lines which determine the lateral edges of the scored area of the sheet 2.

The devices located on opposite sides of the machine and in advance of the scoring rolls 7—7 form parts of an electric alarm circuit, preferably arranged as shown diagrammatically in Fig. 3, as follows:

Conductors 27—27 are connected with the arms 19—19 of the contact rollers 20—20, these conductors being connected in parallel with a main conductor 28. Similarly, conductors 29—29 are connected with the fixed contact members 22—22, and are likewise connected in parallel with the main conductor 28. Inserted in the circuit is an alarm bell 30, a switch 31, and a battery 32. The circuit thus arranged is open or broken under normal conditions, that is, when the contact points 22 and 24 of either alarm device are separated, and similarly the circuit is closed when these points are brought into contact, the closing of the circuit energizing the coil of the bell 30, causing the same to ring.

As shown in Fig. 2, the roller 20 is in contact with the sheet of gum 2, and in this position the contact points 22 and 24 are separated, thus so long as the sheet maintains a uniform width in passing beneath the rollers 20—20, the circuit will remain open. However, should the sheet be of a less width than the distance between the rollers 20—20, it is manifest that one or the other of the rollers 20—20 will run off the sheet and drop down in contact with the plate 3. In Fig. 1 this condition is illustrated, in which the lower margin of the sheet is quite irregular, and has a recess as at 33 which extends inwardly beyond the line of contact of the adjacent roller 20. Thus as this portion of the sheet passes beneath the roller, the latter will run off the sheet and drop downwardly into contact and close the circuit. The ringing of the bell will warn the operator of the machine of the defect in the sheet, and enable him to stop the machine in order to rectify the undesired condition.

That it is desirable to avoid the occurrence of marginal recesses or indentations in the sheet, as shown at 33, will be manifest when it is pointed out that if the sheet were allowed to advance between the scoring rolls, the individual sticks 12 along the recessed margin of the sheet will be imperfect, that is to say, they will be irregular in shape and contain only a portion of the gum that a perfect stick contains. Moreover, inasmuch as the sticks are handled and wrapped into packages by mechanical means, it is manifest that the imperfect sticks would find their way into packages, and as a result, defective packages of gum would be placed on the market. It is clear that, by the presence of an alarm device which automatically sounds when improper conditions are existing, the formation of defective sticks is thus avoided.

The invention is hereinafter more fully set forth in the appended claims.

I claim as my invention:

1. In a machine of the character described, the combination of a sheet scoring member, means for advancing a continuous sheet of material to said scoring member, a contact roller riding freely upon said sheet in advance of said scoring member and in alinement with a predetermined longitudinal score line of the sheet, and an alarm arranged to be operated by said roller upon the failure of the material to be present beneath the same.

2. In a machine of the character described, the combination of scoring rolls, means for advancing a continuous sheet of material between said rolls, a contact roller riding freely upon said sheet in advance of said scoring rolls and in alinement with a predetermined longitudinal score line of the sheet, and an alarm circuit including normally separated circuit closing members, arranged to be brought into contact to close the circuit upon the failure of the material to be present beneath said contact roller.

3. In a machine of the character described, the combination of scoring rolls, means for advancing a continuous sheet of material between said rolls, a contact roller mounted to ride freely on said sheet in advance of said scoring rolls, and in alinement with the outer longitudinal score line of the scored sheet, and an alarm circuit including circuit closing members operative to close the circuit upon the failure of the material to be present beneath said contact roller.

4. In a machine of the character described, the combination of scoring rolls, means for advancing a continuous sheet of material between said rolls, a contact roller mounted upon said machine to ride freely on said sheet in advance of said scoring rolls, and in alinement with the outer longitudinal score line of the scored sheet, and an alarm circuit including normally separated contact members arranged to be actuated to close the circuit in the movement of said roller upon the failure of the material to be present beneath the same.

5. In a machine of the character described, the combination of scoring rolls, means located beyond said rolls for trimming the marginal portions of the sheet not included within the scored area, and a contact roller riding freely on said sheet in advance of said scoring rolls, and in longitudinal alinement with said trimming means, and an alarm circuit including said roller adapted to be closed upon the failure of the material to be present beneath said roller.

6. In a machine of the character described, the combination of means for scoring a sheet advanced through the machine, and an alarm circuit including a sheet contacting member located in advance of said sheet scoring means, and in alinement with the longitudinal margins of the scored sheet, and an alarm device operative by said roller when the same is out of contact with the sheet.

7. In a machine of the character described, the combination of means for scoring a sheet advanced through the machine, and an alarm circuit including a sheet contacting member located in advance of said sheet scoring means, and in alinement with the longitudinal margins of the scored sheet and adapted to close the circuit when out of contact with the sheet.

8. In a machine of the character described, the combination of scoring rolls, means for advancing a sheet of material through said rolls, trimming knives mounted beyond said rolls for removing the marginal portions of the material beyond the outer longitudinal score lines, contact rollers mounted to ride freely upon said sheet in advance of the scoring rolls, and in longitudinal alinement with said trimming knives, and an alarm adapted to be operated by and when one or both of said rollers are out of contact with said sheet.

In witness whereof, I hereunto subscribe my name this 19th day of May, A. D. 1920.

PARKE H. WATKINS.